United States Patent Office 3,509,648
Patented May 5, 1970

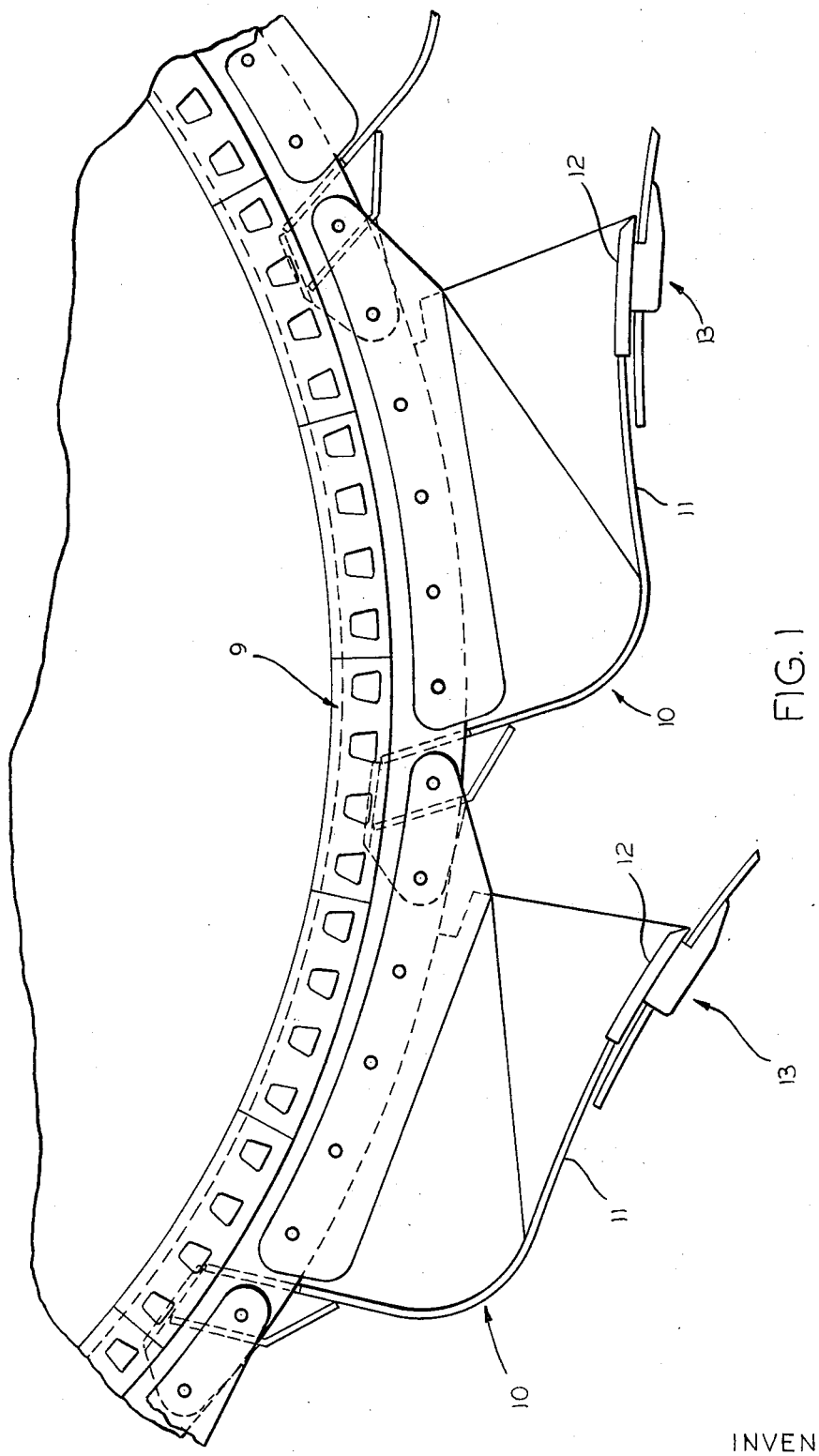

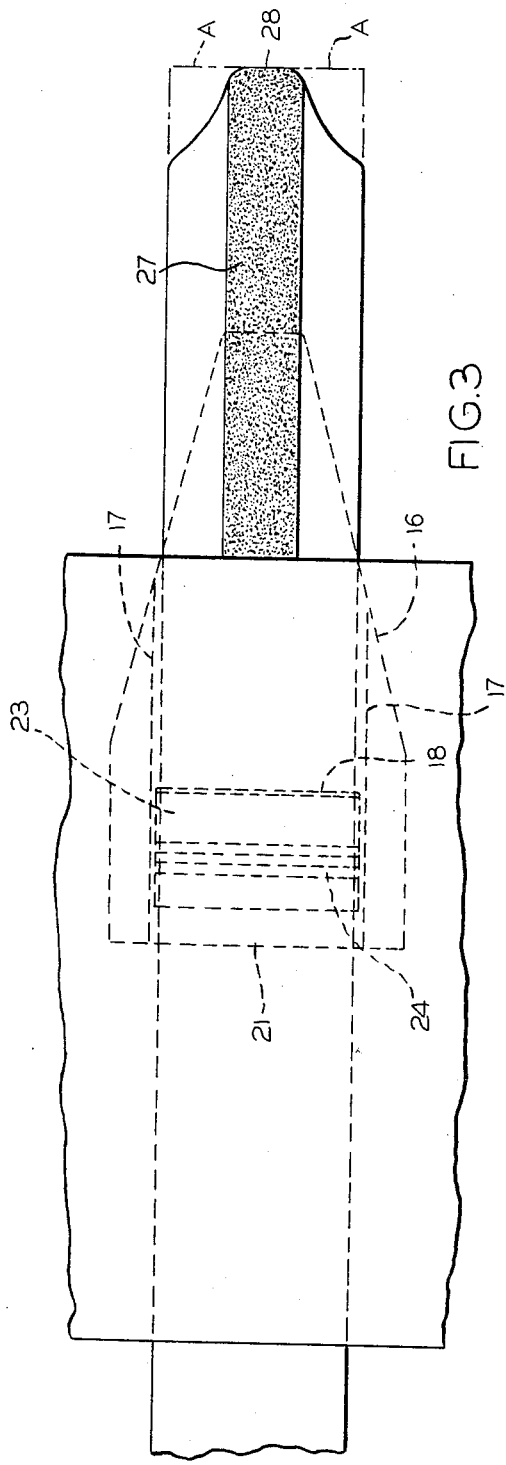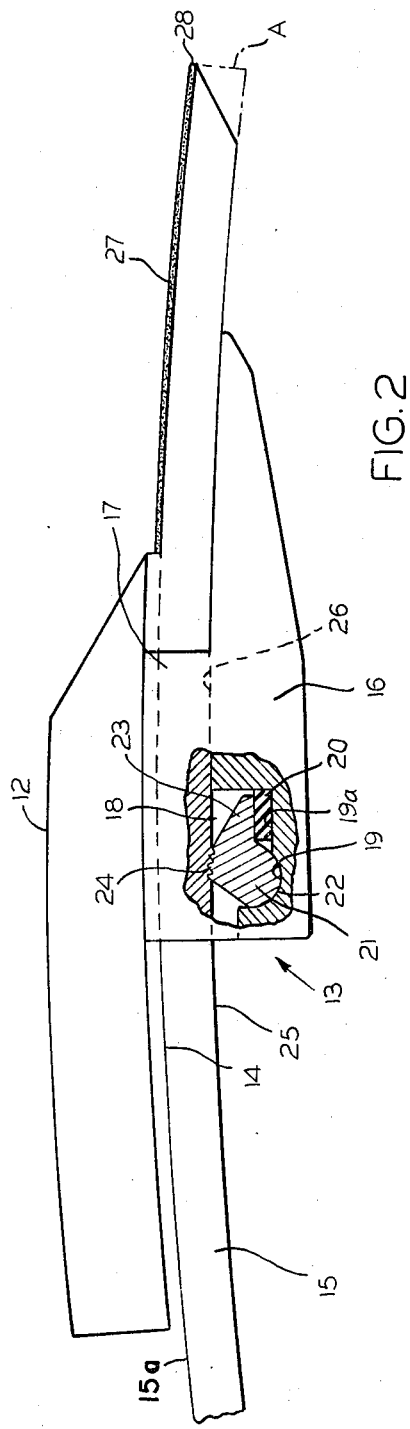

3,509,648
ADJUSTABLE DIGGER TOOTH ASSEMBLY
Fred T. Smith, Aurora, Ill., assignor to Barber-Greene
Company, Aurora, Ill., a corporation of Illinois
Filed Aug. 29, 1967, Ser. No. 664,141
Int. Cl. E02f 9/28
U.S. Cl. 37—142                                    5 Claims

ABSTRACT OF THE DISCLOSURE

A bucket digger tooth assembly wherein a tooth wedging element is swung in in one direction upon digging pressure against the tooth to secure it in place and in an opposite direction upon pressure on the remote end of the tooth to release it for bodily adjustment for wear.

SUMMARY INCLUDING OBJECT AND FEATURES OF THE INVENTION

An object of this invention is to provide an improved digger tooth assembly wherein the tooth is readily releasable for forward adjustment for wear and is self-locking in position upon digger pressure on the tooth.

Another object of the invention is to provide in a digger tooth assembly improved wedging means effective upon digging backward pressure on the end of the tooth to lock the tooth in its support ad releasable upon forward movement of the tooth in the support to adjust the position of the tooth so as to compensate for wear on the tooth end.

A further object of the invention is to provide a digger tooth assembly wherein the tooth is longitudinally adjustable along a curved path to bring the tooth end forward and downward to compensate for wear on the digging end of the tooth.

Still a further object of the invention is to provide a digger tooth forwardly of its support and on its top side with a wear resistant area harder than that of the tooth proper.

In accordance with the general features of this invention, there is provided in a digger tooth assembly which is adjustable for wear, a supporting body, a tooth element having a digger end and a shank telescoping the body, a movable wedge element in the body with gripping means for engaging a side of the tooth element shank and having a pivotal support in the body, the wedge element being releasable by forward movement of the tooth element out of the body to adjust for wear on the digger end and being movable into wedged adjusted position upon digging pressure against the digger end.

In accordance with other features, there is provided in the tooth assembly a wedge element comprising a bodily movable toothed pawl swingably supported in said body for movement in the direction of the length of the tooth element shank.

In accordance with still other features of the invention, there is provided in a digger tooth assembly a supporting body with a longitudinal passage therein defined by at least one surface longitudinally curved in the direction of the length of the body, a tooth element having an external digger end and a shank curved complementally to that of the curved surface of the body, the curved shank being received in the body passage in nested relation to the curved surface for arcuate back and forth movement along the curved surface, and means for detachably and adjustably retaining the tooth element in the body.

A more detailed feature of the invention relates to the provision in a toothed assembly, a supporting body, a tooth adjustably carried by the body and having a forward digging edge the opposite corners of which wear away in use and a wear resisting strip narrower than the width of the tooth only on the top surface of a portion of the tooth forward of the body, the strip being of harder material than that of the tooth and bridging the gap between the worn corners of the tooth digging edge.

Other objects and features of the invention will more fully appear from the following detailed description taken in connection with the accompanying drawings which illustrate a single embodiment of the invention.

DESCRIPTION OF THE DRAWINGS

FIGURE 1 is a fragmentary side view of a sprocket-type bucket digger showing buckets provided with the novel tooth assembly of this invention;

FIGURE 2 is a fragmentary side view of a portion of one of the buckets provided with my novel digger tooth assembly with portions broken away and in section to show the swingable pawl-type tooth wedging element, the dotted lines showing the worn-off tooth corners; and FIGURE 3 is a fragmentary plan view of the structure shown in FIGURE 2 and illustrating the medial location of the wear-resistant strip on top of the forward portion of the tooth, the dotted corners on the tooth showing portions that are worn off by digging in use.

DETAILED DESCRIPTION

Referring to FIGURE 1, there is shown and designated generally by the reference character 9 a more or less conventional chain or sprocket-type digger carrying in the usual way forwardly opening buckets 10. The buckets 10 are likewise more or less conventional with the exception of the curved bottom 11 which has a reinforced curved edge portion 12 and which is associated with my present invention. The digger tooth element assembly embracing this invention and associated with bucket bottom edge portion 12 is designated generally by the reference character 13.

FIGURES 2 and 3 show in detail the structure of the digger tooth assembly 13. It will be noted that the forward bucket edge portion 12 has a curved bottom surface 14 and that associated with this surface is a complementarily curved solid tooth or element 15 having a top longitudinally curved surface shank 15a nested in the curved surface 14.

Depending from and carried by the bucket portion 12 is a bracket 16 having upwardly extending spaced side wings 17—17 (FIGURE 3) suitably secured as by riveting or the like to the bottom of the bucket. The wings 17—17 are spaced a distance sufficient to slideably receive therebetween the tooth element 15. With the exception of the space between the wings 17—17, the bracket 16 is substantially of a solid construction below the tooth element and carries thereon between the wings 17—17 the tooth element 15.

It will thus be appreciated that the bracket 16 together with the forward edge portion 12 of the bucket define a passage in which the tooth element 15 is longitudinally movable and adjustable.

The bracket 16 proper (FIGURE 2) has a portion of it provided with a downwardly extending recess 18 of predetermined configuration. The bottom surface of this recess is partially defined by a curved or socket-like area 19 having extending forwardly therefrom a flat or shelf area 19a on which is carried a resilient or rubber pad 20 which could be made of a polyurethane material and which serves as a good elastomer.

Positioned in the bracket recess 18 is a swingable pawl or wedge element 21 having a lower curved portion 22, the curvage of which is complementary to the surface of a socket 19 for pivotal or limited rotational movement in the socket 19. The wedge element 21 also has a forward arm-like portion 23 adapted to bear on a rubber or elastomer pad 20 which, when pressed downwardly, exerts a conterclockwise force against the wedge element 21. The upper portion of the wedge or pawl element 21 has transverse teeth 24 adapted to bite into a lower curved shank surface 25 of shank 15a of the digger tooth element 15.

It should be noted that the top surface 26 of the bracket 16 between its wings 17—17 has a curve complementary to the curve of the tooth element surface 25 so that the tooth element 15 is movable in a curved path over such surface 26. It will be appreciated that the radius of the curve of the tooth element 26 is very slight and of the order of six to seven feet.

The Rockwell hardness of the tooth element 15, which can be made of any suitable steel, is on the order of 50, whereas the Rockwell of the wedge element or pawl teeth 24 could, for example, be in the area of from 60 to 65. The difference in hardness is sufficient to enable the pawl teeth 24 to bit effectively into the curved under surface 25 of the tooth element 15 upon a counterclockwise or rearward swinging movement of the pawl 21.

Forwardly of the bucket edge 12, the tooth element 15 has suitably secured to its top surface a wear-resisting strip 27 made of very hard metal, such for illustration as a tungsten composition. This wear-resisting strip 27 has a much higher degree of Rockwell hardness and could be, for example, on the order of 80 to 100.

The cross-section of the tooth element 15 is normally rectangular and this is true even at its digging forward end which, however, is adapted to wear off at the corners and at its under surfaces indicated by the dotted lines designated by A in FIGS. 2 and 3. In practice, it has been noticed that this wear occurs fairly promptly so that the effective digging edge 28 of the tooth element 15 is localized in the area of the end of the wear strip or rod 27.

Now, in the use of the digging tool, it will be appreciated that as digging pressure is applied to its end 28, this end will progressively wear rearwardly. In the past with conventional digging teeth, after around 20%–30% had worn off the end of the tooth, the tooth would have to be replaced. According to the present invention, this is not true since it is possible to use as much as, for example, 75%–90% of the tooth element before it has to be replaced.

Normally, when the tooth is in engagement with the work, the pressure on its end 28 forces the wedge or pawl element 21 in a counterclockwise direction, thus firmly securing at all times the tooth element to the forward end portion 12 of the bucket. When the tooth edge is worn down to a certain extent, it is possible by tapping the rear end of the tooth element 15 to move it forward, or in a clockwise direction, in the supporting body which includes the bracket 16 and the forward edge portion 12 of the bucket. In the course of this movement, the wedge or pawl element 21 is moved in a clockwise direction releasing the teeth 24 and depressing the pad 20.

In the course of this forward or clockwise movement of the tooth element, by virtue of the tooth element being curved, it is moved both forwardly and downwardly at its cutting end 28. In other words, it is moved in a direction toward the work or material to be dug.

After the tooth element 15 has been moved to its forward adjusted position, the previously depressed resilient pad 20, in pushing against the wedge element, forces it in a counterclockwise direction and so that its teeth 24 are urged into the under curved surface 25 of the tooth element 15. Further, upon digging pressure being applied to the forward edge 28 of the tooth element, the grip of the teeth 24 against the tooth element is augmented. This insures that the tooth element will always be firmly secured in place in the supporting body at the front edge of the bucket.

I claim as my invention:

1. A digger tooth assembly which is adjustable for wear comprising
    a supporting body with a longitudinal passage therein and having a recess portion,
    a tooth element having a digger end and a shank portion telescopically received in said passage with a rear end of said shank portion projecting out of the body opposite from the digger end, and
    a movable wedge element disposed in said body with gripping means engageable with a side of the shank portion, said wedge element having a curved portion received in said recess and pivotally supporting said wedge element in said passage, said wedge element being held in said recess of said passage by said tooth element and being removable from said passage with the removal of said tooth element therefrom,
    said wedge element being releasable by the tapping of the rear end of said shank portion to move the tooth element forwardly in the passage to adjust for wear on said digger end and said wedge element being movable into gripping engagement with said side of the shank portion by a digging pressure being applied against said digger end.

2. A tooth assembly of claim 1 and further characterized by an elastomer pad disposed in said recess for said wedging element to bear against, said elastomer pad resiliently urging the wedging element into engagement with said shank portion of said tooth element.

3. A tooth assembly of claim 1 further characterized by said recess having a socket portion complementary to said curved portion of said wedging element and having a portion adjacent said socket portion for receiving a resilient means acting on said wedge element to urge it into engagement with shank portion.

4. A digger tooth assembly which is adjustable for wear comprising:
    a supporting body with a longitudinal passage therein defined by at least one surface longitudinally curved in a direction of the length of the body, said passage having a recess,
    a tooth element having an external digging end and a shank portion curved complementary to that of the curved surface of said passage, said shank portion being telescopically received in said passage with a rear end projecting out of the passage opposite from the digger end,
    a movable wedge element disposed in said passage and pivotally supported in said recess and held therein by said tooth element, said wedge element being removable from said passage upon the removal of said tooth element,
    said wedge element being releasable by tapping of said shank end to move the tooth element forwardly in said passage and said wedge element being movable into gripping engagement of said shank portion by a digging pressure being applied against said digger end.

5. A diger tooth assembly according to claim 4, wherein said tooth element is longitudinally curved convexly and has a forward digging edge the opposite corners of which wear quickly away in use and a wear resisting strip narrower than the width of the tooth only on the top surface of a portion of the digger end, said strip being a harder material than that of the tooth element and bridging the gap between the worn corners of the digging edge to define the effective width of the normal digger edge of the digger end.

(References on following page)

References Cited

UNITED STATES PATENTS

| | | | |
|---|---|---|---|
| 1,446,191 | 2/1923 | Levin | 299—91 |
| 1,586,269 | 5/1926 | Smith | 188—67 |
| 1,778,213 | 10/1930 | Fahrenwald | 37—142 |
| 1,804,858 | 5/1931 | Burrell et al. | 188—67 XR |
| 1,815,649 | 7/1931 | Edmunds | 37—142 |
| 1,834,391 | 12/1931 | Edmunds | 37—142 |
| 2,319,464 | 5/1943 | Massa | 37—142 |
| 2,326,377 | 8/1943 | McBride | 188—67 XR |
| 2,491,208 | 12/1949 | Price et al. | 37—142 XR |
| 2,709,860 | 6/1955 | Helton | 37—142 XR |
| 2,805,496 | 10/1957 | Jordan | 37—142 |
| 2,956,792 | 10/1960 | Yates | 37—142 XR |
| 3,041,752 | 7/1962 | Evans | 37—142 |
| 3,286,379 | 11/1966 | Benetti | 37—142 |

FOREIGN PATENTS 1,024,537  3/1966  Great Britain.

EDGAR S. BURR, Primary Examiner

U.S. Cl. X.R.

299—92